(12) United States Patent  
Feng et al.

(10) Patent No.: US 8,321,955 B2  
(45) Date of Patent: Nov. 27, 2012

(54) SYSTEMS AND METHODS FOR PROTECTING AGAINST DENIAL OF SERVICE ATTACKS

(76) Inventors: Wu-chang Feng, Portland, OR (US); Ed Kaiser, Beaverton, OR (US)

( * ) Notice: Subject to any disclaimer, the term of this patent is extended or adjusted under 35 U.S.C. 154(b) by 909 days.

(21) Appl. No.: 12/148,786

(22) Filed: Apr. 22, 2008

(65) Prior Publication Data

US 2010/0031315 A1    Feb. 4, 2010

Related U.S. Application Data

(63) Continuation-in-part of application No. 10/926,487, filed on Aug. 26, 2004.

(60) Provisional application No. 60/498,204, filed on Aug. 26, 2003.

(51) Int. Cl.  
*H04L 9/32* (2006.01)  
*G06F 7/04* (2006.01)

(52) U.S. Cl. .............. 726/27; 726/10; 726/14; 726/3; 726/6; 726/7; 713/168; 713/179; 380/59; 380/1

(58) Field of Classification Search ............. 726/2–4, 726/16–17, 21–23, 26–27, 30; 713/168, 713/179; 380/1, 59  
See application file for complete search history.

(56) References Cited

U.S. PATENT DOCUMENTS

| | | | | |
|---|---|---|---|---|
| 6,381,632 B1* | 4/2002 | Lowell | ............ | 709/203 |
| 6,486,891 B1* | 11/2002 | Rice | ............ | 715/738 |
| 7,149,801 B2* | 12/2006 | Burrows et al. | ............ | 709/225 |
| 7,231,526 B2* | 6/2007 | Hon et al. | ............ | 713/185 |
| 7,398,315 B2* | 7/2008 | Atkinson et al. | ............ | 709/227 |
| 7,430,607 B2* | 9/2008 | Bolles et al. | ............ | 709/229 |
| 7,600,255 B1* | 10/2009 | Baugher | ............ | 726/22 |
| 7,606,915 B1* | 10/2009 | Calinov et al. | ............ | 709/229 |
| 2003/0110266 A1* | 6/2003 | Rollins et al. | ............ | 709/227 |
| 2003/0135587 A1* | 7/2003 | Fisher et al. | ............ | 709/219 |
| 2003/0182357 A1* | 9/2003 | Chess et al. | ............ | 709/203 |
| 2007/0011453 A1* | 1/2007 | Tarkkala et al. | ............ | 713/168 |
| 2008/0065776 A1* | 3/2008 | Moloney et al. | ............ | 709/229 |
| 2008/0172468 A1* | 7/2008 | Almeida | ............ | 709/206 |

OTHER PUBLICATIONS

Liu, Camp. Proof of Work can Work. Mar. 23, 2006. Indiana University School of Informatics. http://citeseerx.ist.psu.edu/viewdoc/download?doi=10.1.1.73.3136&rep=rep1&type=pdf.*

Xiao Feng Wang, Michael K. Reiter; "Defending Against Denial-of-Service Attacks with Puzzle Auctions," Proceedings of the 2003 IEEE Symposium on Security and Privacy (SP'03).

Wu-Chang Feng, Ed Kaiser, Wu-Chi Feng, Antoine Lu; "The Design and Implementation of Network Puzzles", IEEE INFOCOM Mar. 2005.

Matthew Tanase; "Closing the Floodgates: DDoS Mitigation Techniques," (2005).

Matthew Tanase; "IP Spoofing: An Introduction," (Mar. 11, 2003).

J.H. Saltzer, D.P. Reed, D.D. Clark; M.I.T. Laboratory for Computer Science; "End-To-End Arguments in System Design.".

(Continued)

*Primary Examiner* — Tamara Teslovich  
(74) *Attorney, Agent, or Firm* — Valauskas Corder LLC (57) ABSTRACT

Systems and methods utilizing the network layer and/or application layer to provide security in distributed computing systems in order to thwart denial of service attacks. The systems and methods of the present invention utilize puzzles placed at the network layer level and/or application layer level to protect against denial of service attacks. Further, the systems and methods of the present invention advantageously provide a robust and flexible solution to support puzzle issuance at arbitrary points in the network, including end hosts, firewalls, and routers and thereby a defense against denial of service attacks.

13 Claims, 5 Drawing Sheets

OTHER PUBLICATIONS

Gary C. Kessler; "Defenses Against Distributed Denial of Service Attacks," SANS Institute 2000-2002.

Will Knight; "Puzzles Could Block Mass Computer Attacks" (May 14, 2003).

Wu-Chang Feng, Ed Kaiser, "The Case for Public Work," in *Global Internet*, May 2007.

Cynthia Dwork and Moni Naor, "Pricing via Processing or Combating Junk Mail," in *CRYPTO*, Aug. 1989.

Thomas Aura, Pekka Nikander, and Jussipekka Leiwo, "DOS-Resistant Authentication with Client Puzzles," in *Workshop on Security Protocols*, Apr. 2000.

Drew Dean and Adam Stubblefield, "Using Client Puzzles to Protect TLS," in USENIX Security Symposium, Aug. 2001.

Xiao Feng Wang, Michael K. Reiter, "Mitigating Bandwidth-Exhaustion Attacks Using Congestion Puzzles," in *ACM CCS*, Oct. 2004.

Brent Waters, Ari Juels, J. Alex Halderman, and Edward W. Felten, "New Client Puzzle Outsourcing Techniques for DoS Resistance," in *ACM CCS*, Oct. 2004.

Randall Stross, "Hannah Montana Tickets on Sale! Oops, They're Gone," *New York Times*, Dec. 2007.

Luis Von Ahn, Manual Blum, Nicholas J. Hopper and John Langford, "CAPTCHA: Using Hard Al Problems for Security" in *Proceedings of Eurocrypt*, 2003, pp. 294-311.

D. Kesmodel, "Codes on Sites 'Captcha' Anger of Web Users," *Wall Street Journal*, May 2006.

Ben Laurie and Richard Clayton, "'Proof-of-Work' Proves Not to Work," in Workshop on Economics and Information Security, May 2004.

Li Fan, Pei Cao, Jussara Almeida and Andrei Z. Broder, "Summary Cache: A Scalable Wide-Area Web Cache Sharing Protocol," *ACM Transactions on Networking*, vol. 8, No. 3, Jun. 2000.

Flavio Bonomi, Michael Mitzenmacher, Rina Panigraphy, Sushil Singh and George Varghese, "An Improved Construction for Counting Bloom Filters," in *ESA* 2006, Sep. 2006.

* cited by examiner

SYSTEMS AND METHODS FOR PROTECTING AGAINST DENIAL OF SERVICE ATTACKS

This application is a continuation-in-part application of nonprovisional application U.S. Ser. No. 10/926,487 filed Aug. 26, 2004, which claims priority of provisional application U.S. Ser. No. 60/498,204, filed Aug. 26, 2003.

The U.S. Government has a paid-up license in this invention and the right in limited circumstances to require the patent owner to license others on reasonable terms as provided for by the terms of NSF ANI-0230960 and CNS-0627752 awarded by the National Science Foundation.

FIELD OF THE INVENTION

The present invention relates to providing security in distributed computing systems. More specifically, the present invention relates to a systems and methods for using client puzzles to protect against denial of service attacks.

BACKGROUND OF THE INVENTION

The Internet is a publicly available internationally interconnected system of computers (and the information and services provided to users) that uses the IP suite of packet switching communications protocol. In addition to the beneficial communications, the traffic on the Internet includes an enormous amount of potentially deleterious communications.

One form of such deleterious communication involves computer viruses and worms. Computer viruses and worms are programs that make copies of themselves and spread by attaching themselves to a host, often damaging the host in the process. The host may be another computer program, such as an operating system, which then may infect the applications transferred to other computers. Viruses take advantage of standard network protocols such as the World Wide Web, e-mail, and file sharing systems to spread. Notable computer viruses and related worms include the Sasser worm, the MyDoom, the Sobig worm, the Blaster worm, the SQL Slammer worm, the Klez worm, the Code Red worm, the Sircam worm, the VBS/Loveletter worm, and the Melissa worm.

Other deleterious communications involve the use of packets. A packet is the fundamental unit of information carriage in all modern computer networks. Packets can be used to mount denial of service attacks (also identified herein with the acronym "DoS") or distributed denial of service attacks (also identified herein with the acronym "DDoS"), and distributed reflected denial of service attacks (also identified herein with the acronym "DRDoS"). For purposes of this invention, the term DoS attacks will commonly refer also to DDoS and DRDoS attacks.

A DoS attack is an attack on a computer system or networking involving the misuse of packets that causes a loss of service to users (e.g., loss of network connectivity) but not to gain access to the systems. DoS attacks can be perpetrated in a number of ways, such as: (1) consumption of computational resources, such as bandwidth, disk space or central processing unit (CPU) time; (2) disruption of configuration information, such as routing information; and (3) disruption of physical network components.

A DDoS attack is a more advanced and more dangerous form of Dos flooding attack. A DDoS attack doesn't use a single source to attack a target, but instead multiple synchronized launch sites. In a distributed attack, the attacking computer hosts are often personal computers with broadband connections to the Internet. A single master program is installed on one system while agent programs are installed on other computers, thereby turning them later into what are termed "slaves" or "zombies". The master program machine—termed also the "Zombie Master"—then is used to instruct the agent programs—in "zombie" machines—to launch simultaneous DoS attacks against a target or targets. The resultant attack is massive and anonymous since many slave computers are used and without their owner's knowledge. The initial instigator cannot clearly be traced. This is the organization used by many distributed attack tools—such as the windows-hosted "Evil bots" and the "Evil goat Evil bot". With numerous slave hosts, the services of even the largest and most well-connected websites can be denied. Many worms such as Code Red effectively launch a DDoS attack. All DDoS attacks employ the standard suite of communications protocols used to connect hosts on the Internet, termed Internet Protocol ("IP") messages, but employ them in non-standard ways.

More specifically, DDoS attacks involve bombarding a web server with a flood of fake requests to prevent legitimate requests from reaching a location and may crash the server. The attack is coordinated with various other hacked computers making it difficult to identify and block the source of the attack. First, an intruder finds one or more systems on the Internet that can be compromised and exploited, typically with a high-bandwidth connection to the Internet. Second, the compromised system is loaded with hacking and cracking tools such as scanners, exploit tools, root kits, and DDoS programs. This system becomes the master which finds a number of other systems that can be compromised and exploited. The attacker scans large ranges of IP network addresses to find systems running services known to have security vulnerabilities. Automated tools remotely compromise a number of hosts and install the DDoS agents on those systems. The actual DDoS attack occurs when the attacker runs a program at the master system that communicates with all hosts.

A DRDOS attack is a more advanced malicious packet flood attack. In the case of a DRDoS attack, the compromised hosts send their flood traffic to a third party, which unwittingly sends a reply to the forged source/target of the flood. This added stop is used to further obfuscate the true location of the compromised hosts, and in some cases, to multiply the effective attack bandwidth. In other words, a malicious hacker located on the Internet floods Internet routers with connection-requesting packets. The requesting packets carry the fraudulent (spoofed) source protocol. Therefore, the routers believe that the packets are coming from a reliable source, and they reply.

One solution that has been offered to defend against distributed denial of service attacks involves the use of "client puzzles", and, in particular, "application layer puzzles". Client puzzles are generated by the server and solved by the client. For purposes of this application, the terms "client puzzle" and "proof-of-work" ("PoW") challenge are used interchangeably herein.

To understand the current defense strategy provided by the application layer use of client puzzles, one must understand the Opens Systems Interconnect ("OSI") model of network architecture. The OSI architecture is split between seven layers (from highest to lowest): 1. physical layer; 2. data link layer; 3. network layer; 4. transport layer; 5. session layer; 6. presentation layer; and 7. applications layer. Each layer uses the layer immediately below it and renders services to the layer above. Of particular relevance to the present invention are the network layer, the transport layer, and the application layer.

As stated, the network layer is the third lowest layer in the OSI seven layer model. At that level, the routing of packets of data from a sender to a receiver via the data link layer is determined. The most common network layer protocol is the "Internet Protocol" or "IP". This is the only protocol that is common across all forms of Internet communication.

The transport layer is in the middle layer of the OSI seven layer model. It is at this layer that it is determined how the network layer may be used to facilitate the provision of an error-free, point-to-point connection so that one host can send messages to another host without corruption and in correct order. The transport layer establishes and dissolves connections between hosts. One example of a transport layer protocol is the Transmittal Control Protocol ("TCP").

The application layer is the top layer of the OSI seven layer model. At this layer, issues such as network transparency, resource allocation, and problem partitioning are handled. One example of an application layer protocol is the Hyper-Text Transport Protocol ("HTTP"). Currently, CAPTCHAs ("Completely Automated Public Turing test to tell Computers and Humans Apart") exist as a type of proof-of-work challenge on the application layer. CAPTCHAs are used in computing to determine that the user is not run by a computer. CAPTCHAs are used to prevent automated software from performing actions which degrade the quality of service of a given system. The process involves one computer, such as a server, asking a user to complete a simple test which the computer is able to generate and grade. Because other computers are unable to solve the CAPTCHA, any user entering a correct solution is presumed to be human. A common type of CAPTCHA requires that the user visually verify by typing the letters of a distorted image, sometimes with the addition of an obscured sequence of letters or digits that appears on the screen. Since a CAPTCHA is administered by a machine and targeted to a human user, problems arise when a user finds it hard to read the characters of the CAPTCHA or the user has a disability such as blind, low vision, or a learning disability such as dyslexia.

Although current client puzzles on the application layer do not require changes to any protocols, installation of software is required on the client or server. Wide-scale adoption of this software in order to operate properly is problematic—clients that fail to have the software installed are denied access to resources.

Under normal conditions, a server accepts any connection request from any client. To effect a client puzzle defense, a server or network that is to be protected generates and sends to a client that is requesting connection a cryptographic puzzle that the client must answer correctly before it is given service. The server allocates the resources necessary to support a connection only to those clients that respond correctly to the puzzle within a predetermined time period. While the non-attacking client will experience only a slight delay in obtaining a connection during an attack, the attacker—given the high volume of connection requests generated by it—will require an incredible amount of processing power to sustain the number of requests necessary for a noticeable interruption in service, thereby thwarting the attack. The client puzzle defense, however, has only been used as an application and transport layer defense against attacks. Placing a defense at such layers does not always provide a robust defense.

Therefore, a need exists for a robust defense against all types of denial of service attacks across all forms of Internet communication that is backwards compatible. The present invention satisfies the demand by placing a puzzle defense system within the network layer or within the application layer to protect all network applications or all web applications, respectively, from DoS attacks.

SUMMARY OF THE INVENTION

The system and methods of the present invention defend against forms of deleterious Internet communication such as a variety of DoS attacks. The system and methods utilize client puzzles. Puzzles are advantageous in that they are resilient to denial of service attacks itself because the protocols and implementations of them can be made efficient. The ability to generate, give out, and remember puzzles are orders of magnitude faster and cheaper than the ability to answer them. Specifically, it is extremely hard for flooding attacks to saturate a system's ability to issue puzzles and it is possible for the defended system to support a large number of puzzle answers using mechanisms such as cookies. (For purposes of this application, a cookie is a little piece of information delivered to a client by a server that contains information that can be retrieved by the server later.) Placing non-transparent puzzles at the network layer, or transparent puzzles at the application layer, gives the present invention particular robust qualities.

The puzzles of the present invention are resilient to circumvention or misuse. In particular, the protocols and implementation guard against replay attacks and answer "hi-jacking". ("Hi-jacking" is considered to be the capability of using someone else's answer to get access to a service.) With non-transparent client puzzles at the network layer or transparent puzzles at the application layer, it is not possible for third parties to deny clients access to services by inserting themselves into or tampering with the puzzle protocols. Subversive attacks are especially important to guard against if puzzles are to be implemented at the network IP layer or application layer.

For example, consider a router that receives a puzzle from a downstream node. (A node is considered to be an alternate network device or an end host.) Due to the weakness of the Internet's identification mechanisms and the distributed nature of the routing infrastructure, the router is unable to determine the authenticity of the puzzle issuer's identity and whether or not the issuer is actually providing any service. Using the methods and protocols described, an attacker either spoofing the IP address of a legitimate source or claiming to be a legitimate source cannot disable the victim by falsely triggering the puzzle mechanisms against it.

Puzzles have clear similarity to explicit congestion notification and network congestion control in general. Puzzles are effectively mandatory multi-resolution congestion controls. As with congestion control, control algorithms are essential for proper operation. There are several issues that make the control of puzzles difficult. The first is that puzzles can be adjusted to many levels. For a particular node, the network or end host has the ability to dynamically determine the level of difficulty of the puzzle that is appropriate in order to control the node's behavior. The second is the same puzzle had non-uniform impact across different nodes.

There are many benefits for thwarting DoS attacks, for example, eliminating downtime, reducing expenses associated with the attacks, reducing or slow down spam, maintaining service in times of heavy load induced by DoS attacks. Further, network puzzles can be applied to all communication from a client. Attacks that use seemingly innocent communication channels for coordination can be thwarted by having difficult puzzles applied to the coordination traffic in addition to the attack traffic. In addition, while being able to defend against a variety of in-network attacks, network puzzles can also be used to make previously voluntary protocols mandatory. For example, network layer puzzles as well as application layer puzzles can be used to enforce mandatory congestion control. If a server becomes congested, it can force its clients to slow down by using harder puzzles.

The present invention provides an effective puzzle-based alternative to TCP's slow-start, fast recovery, and congestion avoidance algorithms and current approaches for active queue management. The present invention provides much better control via multi-resolution congestion feedback as well as the ability to handle non-responsive flows. As an interesting side effect, puzzle-based congestion control replaces the arbitrary bias against clients with long round-trip times with an equally arbitrary bias against clients with slow CPUs. In particular, one embodiment of the present invention places puzzles in a layer that is common to all network activity, the IP layer. In another embodiment the present invention places puzzles in the application layer to protect all web applications.

In embodiments of the present invention that place puzzles in the application layer to protect all web applications, proof-of-work ("PoW") challenges and solutions are embedded in Uniform Resource Locators ("URL") as new query parameters. For example, as web pages are served, the URLs found in any Hyper-Text Markup Language ("HTML") tags are updated to include a proof-of-work challenge. Additionally, when a client's browser finds a PoW-protected link, it runs a server-provided script, such as JavaScript, to solve the challenge and append the solution to the URL. According to the present invention, clients that do not have the server-provided script enabled (such as JavaScript) are not necessarily prevented from accessing the content.

A URL identifies a resource and locates the resource by describing its network 'location' whereas HTML is the predominant language for web pages. HTML describes the structure of text-based information in a document by denoting certain text as links, headings, paragraphs, and lists to name a few. HTML is written in the form of tags, surrounded by angle brackets.

A client requests accesses to a web resource. Upon receiving a request, the server verifies that the URL contains a valid challenge and correct solution before servicing it. If either the challenge is stale or the solution is incorrect, the system denies the request and returns an error page containing a link to the resource and a new challenge.

In one embodiment, the service request of a client is prioritized. First, a connection between a client and a server is formed, whereupon a network protocol is initiated. A first request is sent from the client to the server to access a server resource. The request is received by the server whereupon the current and historical load of the client is determined by evaluating the loads to a threshold value. The threshold value may be, for example, a hash function including a client-specific nonce generated by the web server and a client-specific difficulty level set by the web server.

Depending on the loads of the client, a proof-of-work ("PoW") challenge is created. The proof-of-work challenge is proportional to the historical load the client has placed upon the server as well as the current load on the server. The server transmits the proof-of-work challenge to the client over the application layer. More specifically, the proof-of-work challenge is embedded within a URL found in any HTML.

In addition to the proof-of-work challenge, an instruction to obtain a solution is supplied from the server to the client. More specifically, the instruction is embedded within a URL using HTML to reference a scripting language file, for example a JavaScript file, although other scripting language files are contemplated utilizing other scripting languages such as Perl, Object REXX, Python, Kistart, Jscript, VBScript, and the like. Mixed scripting language files such as a Windows Script File (WSF) can also be referenced. Alternatively, Cascasding Style Sheets (CSS), XML, XSLT, and techniques involving a combination of XML and JavaScript scripting called AJAX can be utilized. Furthermore, the Mozilla project's XUL scripting can be used.

Upon transmitting the proof-of-work challenge and supplying the instruction, the connection between the client and the server may be aborted. The client solves the client the proof-of-work challenge to obtain a solution. A second request is forwarded from the client to the server. The second request includes the proof-of-work challenge and the solution. The server accepts the second request from the client and establishes a solution value based on the accuracy of the proof-of-work challenge and the solution. The solution value is compared to a threshold value and the request is assigned a priority value. The server processes the second request by the client by either allowing the request to access server resources to proceed or denying the request.

Specifically, properties of functions such as congestion control and DoS prevention are destroyed if any adjacent or underlying protocol in a layer does not implement it. As IP packet flooding thwarts DoS-resistant authentication protocols, the placement of puzzles in embodiments of the present invention at the network layer (such as in IP) permits the network layer to no longer be the weakest link. In embodiments of the present invention that place puzzles in the application layer (such as in HTTP) permits the application layer to no longer be the weakest link. Thus, the present invention, in one embodiment, is a puzzle protocol and algorithm at the network layer and in another embodiment, a puzzle protocol and scripting language file at the application layer.

The present invention is directed to a system and methods of mitigating the effects of DOS attacks, particularly DDoS attacks and DRDoS attacks.

One object of the present invention is to provide a system and methods of providing protection against simultaneous attacks across a wide range of applications and protocols by placing efficient, scalable, fine grained, adaptable and controllable puzzles at a layer common to all network applications, the network layer. Thus, the protocol is flexible to support puzzle issuance at arbitrary points in the network, including end hosts, firewalls and routers.

Another object of the present invention is to provide a system and methods of providing protection against simultaneous attacks across a wide range of web applications and protocols by placing efficient, scalable, fine grained, adaptable and controllable puzzles at a layer common to all web applications, the application layer. Thus, changes to any protocols are not required.

For purposes of this application, a firewall is a set of related programs, located at a network server that protects the resources of a private network from users of other networks. Basically, a firewall, working closely with a router program, filters all network packets to determine whether to forward them toward their destination. A firewall is often installed away from the rest of the network so that no incoming request can get directly at private network resources. Further, a router determines the next network point to which a data packet should be forwarded toward its destination. The router is connected to at least two networks and determines which way to send each data packet based on its current understanding of the state of the networks it is connected to. Routers create or maintain a table of the available routes and uses this information to determine the best route for a given data packet.

A further object of the present invention is to provide a system and methods that effectively thwart DoS attacks, enables the puzzles to be scalable, tamper-resistance, fair, and controllable. The protocol supports the issuance of puzzles at arbitrary resource granularities such as on a per host, per flow, or per packet basis. Specifically, puzzles can be issued at any point during the lifetime of a flow provided the system and methods do not limit replay attacks over time and space. Puzzle answers are not valid indefinitely and not usable by other clients. The system prevents attacks from adversaries that do not lie along the path from the client to the issuer, or server.

An additional object of the present invention is to provide a system and methods that implement the protocol within the fast path of network hardware which gives every network device along the path from the client to the server the choice of participating as a puzzle issuer or not. When no intermediate network devices wish to participate, the server is responsible for issuing puzzles itself. The present invention uses a puzzle to issue firewall protection to the server allowing the server to focus on its original tasks.

Another object of the present invention is to provide a system and methods that provides a proof-of-work challenge that is proportional to the maliciousness of a client. Maliciousness of a client is measured by the historical load the client has placed upon the server as well as the current load on the server. For example, more malicious clients are issued more difficult client puzzles. Therefore, the client puzzle has a difficulty level tailored to the client. Difficulty is expressed in terms of units of work, wherein each unit is a uniform computation, for example, execution of a hash function.

Another object of the present invention is to provide a system and methods that provides efficiency, host binding and time binding. Efficiency allows the present invention to operate with minimal overhead thereby minimizing the risk for attack. Host binding allows the proof-of-work challenge to be bound to the client-server connection to ensure the correct client is throttled. "Throttle" is a method of ensuring a system limits the quantity of data transmitted and/or received within a specified period of time. Time binding allows the present invention to resist pre-computation of the client puzzle and replay attacks for responsive real-time throttling.

Another object of the present invention is to provide a system and methods that operates non-transparently at the network layer to protect all network applications.

Another object of the present invention is to provide a system and methods that operates transparently at the application layer to protect all web applications. User input is not needed for the server to limit the quantity of data it transmits and/or accepts within a specified period of time.

Yet another object of the present invention is to provide a system and methods that is backwards compatible allowing incremental deployment. For example, clients that have previously been unable to solve proof-of-work challenges are still able to access server resources, albeit at a lower priority.

The present invention will be further appreciated, and its attributes and advantages further understood, with reference to the detailed description below of some presently contemplated embodiments, taken in conjunction with the accompanying drawings, in which:

DETAILED DESCRIPTION OF EMBODIMENTS OF THE INVENTION

Figure 1:
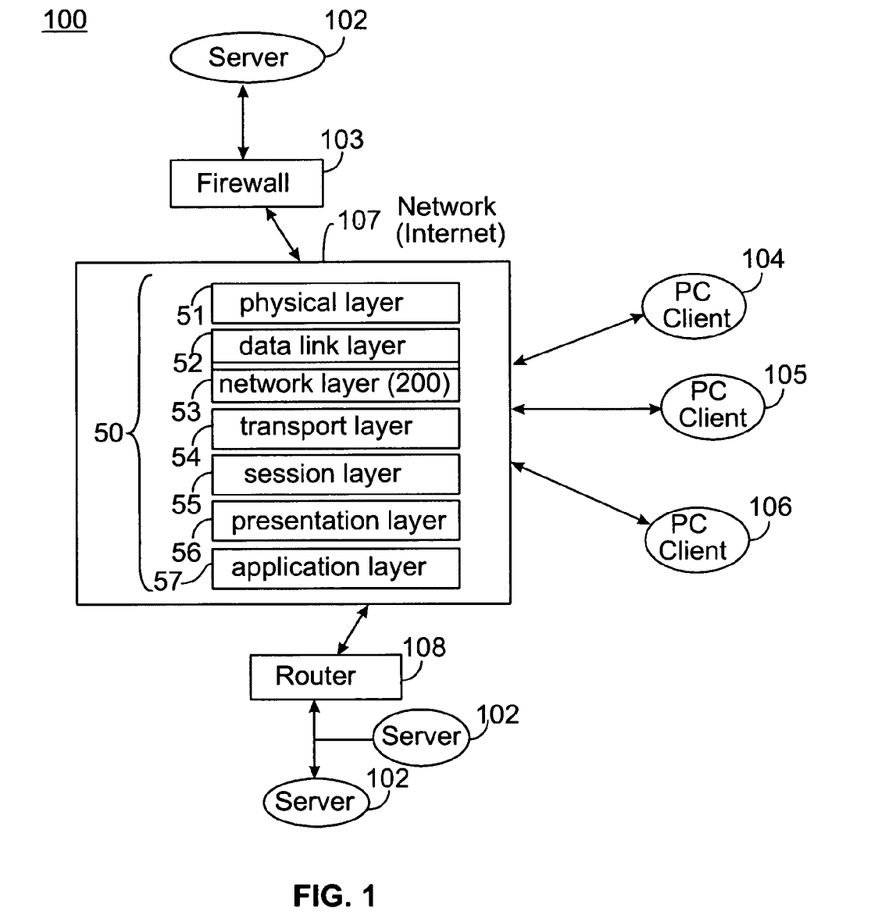
FIG. 1 shows a computing or communications system according to the present invention.

FIG. 1 is a computing or communications system 100 according to the present invention. The illustrated system 100 includes a server 102 protected by a firewall 103 and that communicates with a plurality of clients, for example clients 104-106. Router 108 can route packets from a plurality of computers or servers 102 based on network layer information and routing tables, often constructed by routing protocols based on communication that takes place through a network 107.

Network 107 includes a set of layers 50: physical layer 51; data link layer 52; network layer 53; transport layer 54; session layer 55; presentation layer 56; and applications layer 57. Each of the layers 50 uses the layer immediately below it and renders services to the layer above. A solution to defend against DoS attacks involves the use of "client puzzles" placed at the network layer because it is shared across all applications. One example of such a solution is "IP layer puzzles". The puzzle defense system 200 (FIG. 2) is placed on the network layer 53 that is shared across all applications to simultaneously protect all applications against DoS attacks.

Network 107 can include any type of wire or wireless communication channel which couples computing nodes. This includes, for example, a local area network, a wide are a network or a combination of networks. For purposes of the present invention, network 107 includes the Internet. The Internet may be hosted by an Internet service provider or ISP.

Server 102 and clients 104-106 include any type of computer system, for example, a computer system based on a microprocessor, a mainframe computer, a digital signal processor, a portable computing device, a personal organizer, a device controller, and a computation engine. Clients 104-106 communicate across the network 107, and the server 102 services requests from the clients 104-106 for computation. The present invention utilizes a network 107 at which client puzzles are requested to protect the system 100 against a variety of DoS attacks including DDoS.

The network-level puzzle protocol of the present invention clearly supports constant-state operation. By adopting nonce mechanisms used in, for example, cookies and in other security protocols, the protocol of the present invention allows a server to issue puzzles and verify their answers without having to store additional states. (For purposes of this application, a nonce is a random value sent in an authentication communications protocol exchange, often used to detect replay attacks. A cookie is a little piece of information delivered to a client by a server that contains information that can be checked by the server later.)

Figure 2:
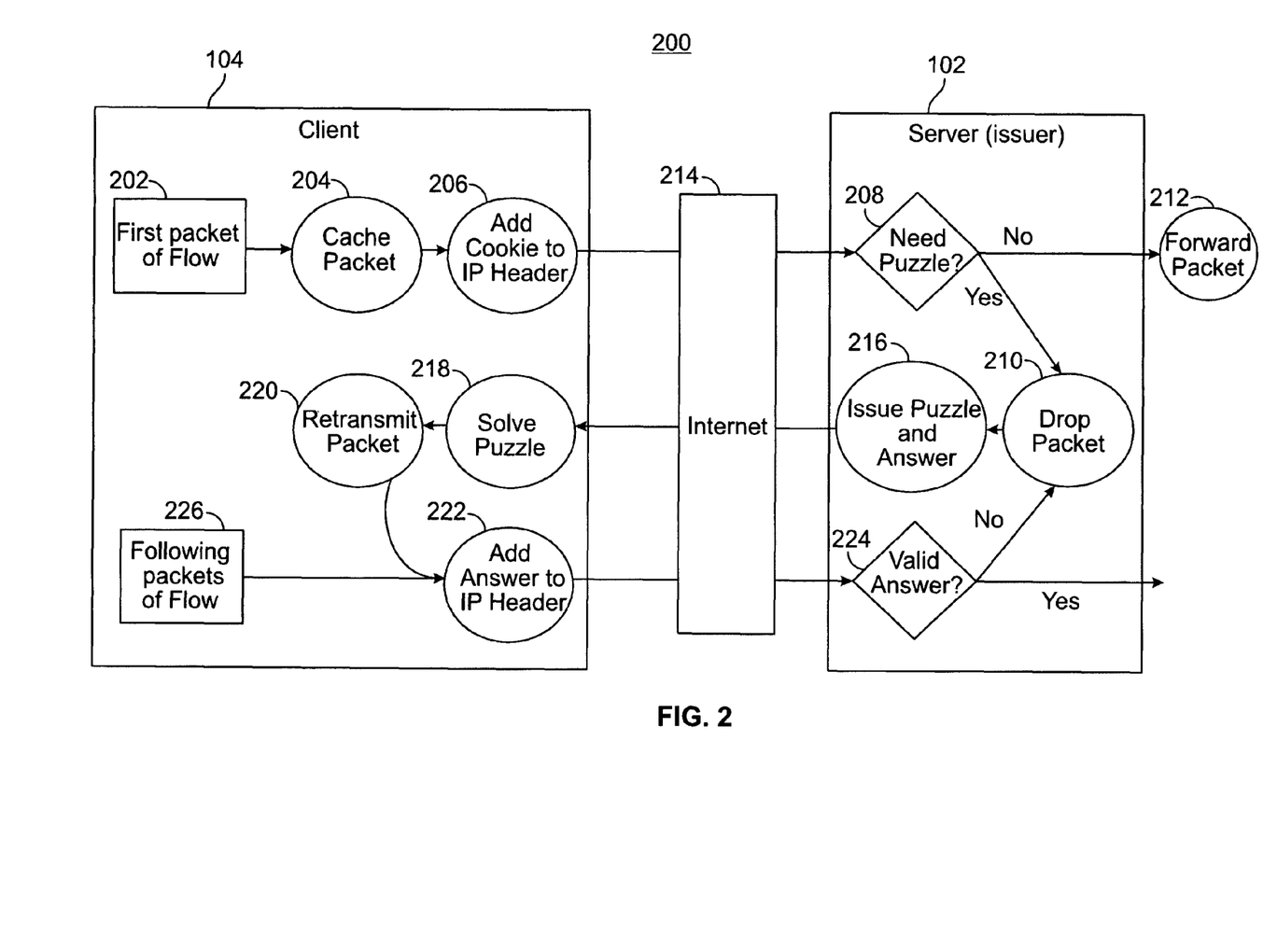
FIG. 2 is a network puzzle defense system of the puzzle protocol framework at the network layer according to the present invention.

FIG. 2 illustrates the basic protocol of the present invention that supports a constant-state operation at the server and client. The protocol functions at the network layer 53 and is unique to the system. The only state required is a set of randomly-generated, periodically-updated client nonces and server nonces that are kept secret from others.

In the one method of the present invention shown FIG. 2, a network puzzle defense system 200 is shown in which each client, e.g., clients 104, 104 and or 106, or proxy (see FIG. 3) acting on behalf of the client, attaches a nonce including a cache packet 204 and cookie 206 to a first packet 202. A timestamp can be also attached. The client, e.g., client 104 caches its packets for retransmissions in case of packet loss. The puzzle issuer is the server 102, the network device or end host which issues the puzzle. Client can be the client 104 or proxy 109 that solves the puzzles.

The puzzle protocol begins with a client request stream that consists either of packets or connection requests. The client keeps track of a periodically updated, randomly-generated, nonce array indexed by a timestamp. Preferably, a circular nonce array can be used. Because a nonce is kept secret from all others and changes with time, it is easy to tell whether or not an attempt at replay or reproduction of a puzzle or answer is legitimate. The nonce and timestamp within a cookie can be compared directly to actual nonces and timestamps at the client or server. If they are valid, the attempt is authorized, otherwise the attempt is not authorized.

New nonces are generated and placed in the array replacing older expired nonces. In addition, a client managed expiry time is added to each nonce entry to give the client control over how long its nonces remain valid. The client sends a client cookie with each request or packet consisting of a nonce and a timestamp. This can be done using a separate option or using unused fields in protocol headers, such as the IP identifier field.

The packet 202, with cache packet 204 and cookie 206 is transferred to the server 102 via the Internet 214. If the server 102, router 108, or firewall 103 is configured to request that the client, e.g., client 104, solve a puzzle 208 before forwarding on the packet received from the client 104, the system drops the packet 210. Otherwise, the system forwards the packet 212. If the packet is dropped, it is simply deleted by the router 108 or firewall 103. If the packet is forwarded 212, it is simply passed to the appropriate interface based on what the routing table indicates (i.e. it is processed as normal packets are in routers). If the system recognizes the packet as communication that is deleterious 102, it drops the packet 210 and the system issues to the client 104 a puzzle. The system can be configured to recognize deleterious communication from standard mechanisms such as firewall rule sets, known lists of compromised or malicious machines (supplied by Dshield or by Spam blacklists), or intrusion detection system information (such as Snort). For purposes of the application, an issuer may not only be a server 102, but also a router 108, firewall 103, or proxy 109 each having the capability of generating a puzzle along the path of communication.

In order for a server 102 to issue a valid puzzle to the client 104, the server 102 must echo the client nonce and timestamp back in order to get the client to solve a puzzle. A client 104 receiving a puzzle also receives the echoed timestamp, uses the timestamp as an index into its local nonce cache, and verifies that the echoed nonce is still valid before solving the puzzle. An advantage of this method is that client nonces prevent spoofing attacks from malicious third parties that are not along the path of the stream. This also prevents a puzzle issuer from generating and giving back puzzles indefinitely to the client, when the client is no longer receiving service from it. Puzzle issuers must have received a recent nonce from the client in order to issue a valid puzzle.

In addition to the issuer generating a puzzle and answer, the server further generates a hash of the answer, the server nonce, the puzzle expiration time, the puzzle maturity time, and the flow identifier. This hash allows the server to check the client's subsequent answer without having to store the answer itself. It also binds the puzzle and subsequent answer to the original packet. The client can not attach the answer to any other communication through the issuer. Finally, the hash prevents the client from re-using the answer indefinitely.

A hash is a one-way function that is infeasible to reverse the process to determine the original message. Also, a hash function will not produce the same message digest from two different inputs. An algorithm that maps or translates one set of bits into another (generally smaller) set in such a way that: A message yields the same result every time the algorithm is executed using the same message as input. It is computationally infeasible for a message to be derived or reconstituted from the result produced by the algorithm or to find two different messages that produce the same hash result using the same algorithm. Among its functions, the hash binds the puzzle and its answer specifically to the flow's packet.

The client nonce ensures that the issuer is actually along the path of the communication and that the puzzles are not being spoofed by a third party. The secret server nonce is used to validate that an answer is correct. The hash is generated using the server nonce and the answer. The server checks the client's answer by recalculating the hash when the client has calculated and attached the answer in its retransmission. The estimated puzzle difficulty level, the puzzle maturity time, and the puzzle expiration time may be optionally sent. Sending this information serves several purposes. It allows the server to tightly bind the time in which the puzzle is valid allowing it to pre-issue puzzles ahead of time. The mechanisms also allow the client to determine whether or not it has the resources available to answer the puzzle in time and to allow for a smooth transition between puzzle answers. Finally, sending the cookie allows the server to verify the answer and the timestamps without having to store each locally.

Upon receiving a request or packet that triggers the puzzle mechanisms, the puzzle issuer, e.g., server 102, generates and dispatches a puzzle 216 to the client 104 via a packet 216. The packet, for example, can be an Internet Control Message Protocol (ICMP) packet. There are many types of ICMP packets including the ICMP puzzle message that is an aspect of the present invention. The ICMP puzzle message delivers the puzzle to the end-host. Again, the issuer 102 may further generate a server cookie consisting of a server timestamp, an estimated puzzle difficulty level, a puzzle maturity time, a puzzle expiration time, and a hash of the puzzle answer, the server nonce, the server timestamp, and the client cookie.

The present invention utilizes a server cookie which permits the server 102 to verify a subsequent answer from the client 104 without remembering either the puzzle or the answer. The cookie binds to particular header fields of the packet so that the puzzle (and its answer) can only be used for that particular packet (or a limited set of packets). This prevents port scanning activity. The client, assuming the client nonce was echoed successfully, can then solve the puzzle 218.

The client 104, upon receiving the puzzle, can calculate the solution 218 and attach the answer 222 to a retransmission packet. The client 104 then transmits the packet with the answer, in addition to anything else that it received from the server 102. The packet transmissions are integrated with other packets of flow 226. In addition to the answer, it echoes the server cookie which allows the server 102 to validate the puzzle. Upon receipt of this message, the server may take the server timestamp, uses it to index into the server nonce cache to obtain the server nonce, checks that the nonce has not expired, and verifies the cookie by regenerating the hash and comparing it against what the client sent. The inclusion of the puzzle difficulty and the timestamp server also serve a dual purpose in that they allow the server to easily determine how quickly an answer was generated. This can be used as feedback to the puzzle control algorithm to adapt the puzzle difficulty.

The server 102, given the answer attached to the packet, recalculates the cookie and compares it against the cookie that the client 102 has echoed. If it is valid 224, the packet is forwarded. If not, it is dropped and another puzzle is issued.

Figure 3:
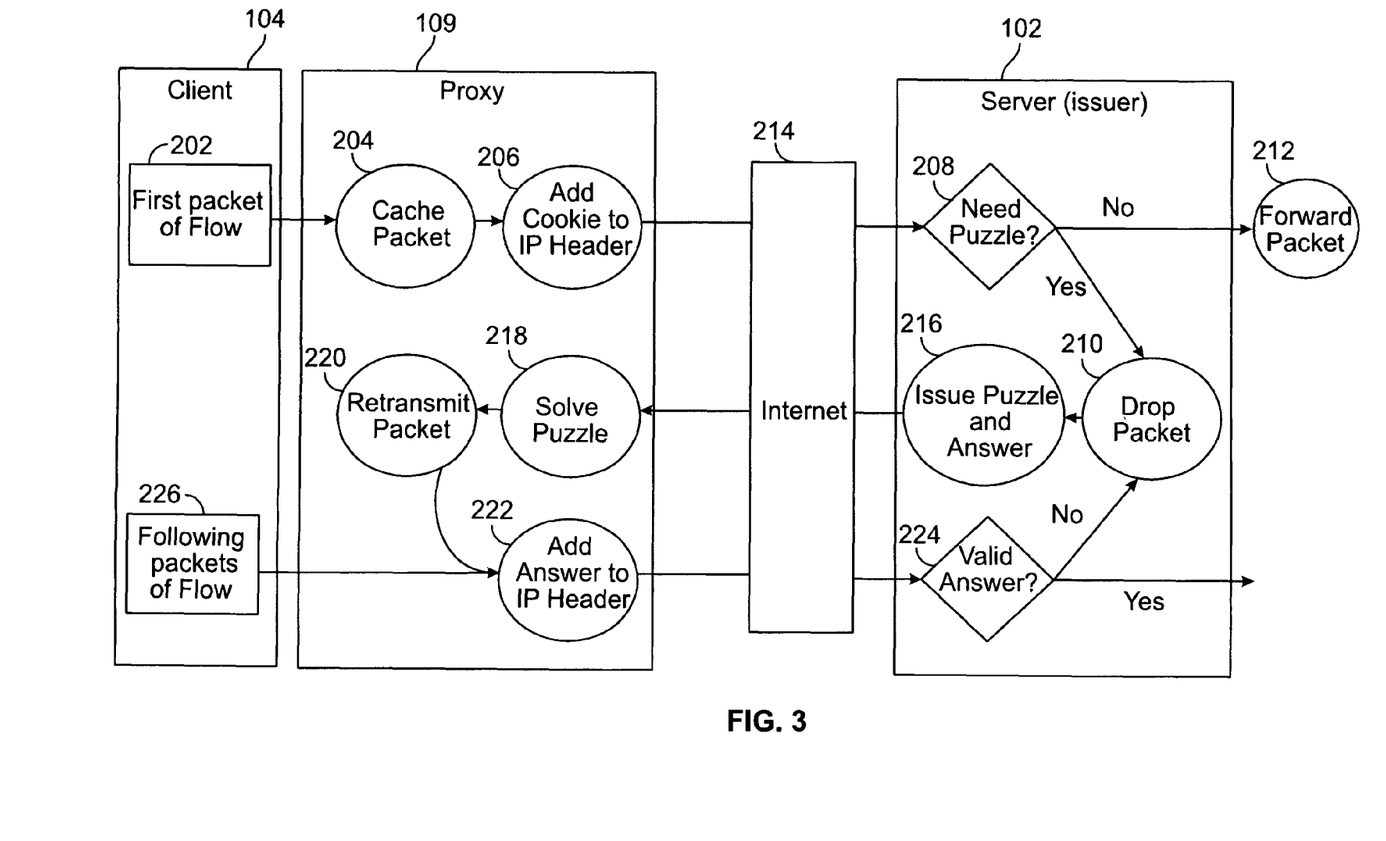
FIG. 3 is an alternate embodiment of a network puzzle defense system of the puzzle protocol framework at the network layer according to the present invention.

FIG. 3 is an alternate embodiment of a network puzzle defense system of the puzzle protocol framework at the network layer according to the present invention. This embodiment utilizes a proxy 109. (A proxy is a firewall mechanism that replaces the IP address of a host on the internal (protected) network with its own IP address for all traffic passing through it. In other words, a proxy is an intermediate server that sits between the client and the origin server. A proxy refers to a special kind of server that functions as an intermediate link between a client application and a server. The proxy server intercepts requests for information from the real server and whenever possible, fills the request. When it is unable to do so, the request is forwarded to the real server.)

The proxy accepts requests from clients, transmits those requests on to the origin server, and then returns the response from the origin server to the client. If several clients request the same content, the proxy can deliver that content from its cache, rather than requesting it from the origin server each time, thereby reducing response time.

In this embodiment, the first packet of flow 202 is generated from the client 104 and passed to a proxy 109. The proxy 109 acts on behalf of the client 104, attaches a nonce including a cache packet 204 and cookie 206 to a first packet 202. The packet 202, with cache packet 204 and cookie 206 is transferred to the server 102 via the internet 214. If the server 102 is configured to request that the proxy 109 solve a puzzle 208 before forwarding on the packet received from the proxy 109, the system drops the packet 210. Otherwise, the system forwards the packet 212. If the packet is dropped, it is simply deleted, for example by the router 108 or firewall 103. If the packet is forwarded 212, it is simply passed to the appropriate interface based on what the routing table indicates. If the server 102 drops the packet 210, the server 102 issues a puzzle and answer 216 to the proxy 109.

Upon receiving a request or packet that triggers the puzzle mechanisms, the puzzle issuer, e.g., server 102, generates and dispatches a puzzle 216 to the proxy 109 via a packet 216. The proxy 109 solves the puzzle 218.

The proxy 109, upon receiving the puzzle, can calculate the solution 218 and attach the answer 222 to a retransmission packet. The proxy 109 then transmits the packet with the answer, in addition to anything else that it received from the server 102. The packet transmissions are integrated with other packets of flow 226 from the client 104.

The puzzle protocol includes the following components:

| Protocol Field | Description |
|---|---|
| Client Cookie | $TS_C, N_C$ |
| Server Cookie | $TS_S, TS_m, TS_e, h (A, TS_C, N_C, TS_S, N_S, TS_m, TS_e, F)$ |
| Puzzle | Puzzle and Parameters (hints, difficulty) |
| F | Flow identifier |
| Answer | Puzzle Answer |
| $TS_C$ | Client Logical Timestamp |
| $N_C$ | Client Nonce |

| Protocol Field | Description |
|---|---|
| $TS_S$ | Issuer Timestamp |
| $N_S$ | Issuer Nonce |
| $TS_m$ | Puzzle Maturity Time |
| $TS_e$ | Puzzle Expiry Time |
| h( ) | Keyed hash function |

While the puzzle protocol framework allows for constant state server operation with some protection against replay attacks, puzzles at the network layer must also support fine-grained control of high-speed links and high throughput servers.

Irrespective of any puzzle algorithm used in conjunction with the present invention, in terms of efficiency, the puzzle generates and the answer is verified in the shortest length of time possible in order to support large streams of packets and connections from a vast number of clients. In terms of granularity, it is possible to finely control end-point behavior with puzzles to maintain high utilization. The present invention operates using any puzzle mechanism, for example, time-lock puzzles, hash-reversal puzzles, multiple hash-reversal puzzles, and hint-based hash-reversal puzzles.

Time-lock puzzles advantageously control the particular amount of computation time a client must expend in order to solve the puzzle. One of the more promising approaches for implementing time-lock puzzles is based on the notion of repeated squaring: an inherently sequential process that forces the client to compute in a tight loop for a pre-determined amount of time. With such time-lock puzzles, the server estimates the number of squaring operations a client can perform per second (S), and determines the amount of time it wants a client to spend in solving the puzzle (T). Given this, it calculates t=T×S, the number of "squarings" that must be performed to solve the puzzle and forces the client to calculate $b=a^{2t}(\mod n)$. For the present invention, it is important to note that puzzle generation is limited by the calculation of two values:

$$e=2^t(\mod((p-1)(q-1))) \text{ and } b=a^e(\mod pq).$$

Hash-reversal puzzles force clients to reverse hashes calculated at the server. To provide a variety of difficulty levels, such puzzles are typically based on reversing a one-way hash given the original input with a certain number of bits (n) erased. The client must perform a brute-force search on the remaining bits of input by hashing each pattern in the space until it finds the answer. Since the hashes can be performed very quickly and are compact, puzzle generation times and puzzle sizes are smaller than that of time-lock puzzles. Unlike time-lock puzzles, however, hash-based puzzles of adjacent difficulties vary by a factor of two. Reversing a hash with n bits of the input string erased is twice as hard as reversing a hash with n−1 bits of the input string erased.

Granularity problem is mitigated by randomizing the difficulty level so that the aggregate difficulty can be adjusted at a finer granularity. Alternatively, multiple "sub-puzzles" or multiple has-reversal puzzles of varying number of bits are attached to force the client to solve each. For example, assuming each hash requires u amount of work, if the difficulty required calls for $(2^{10}+2^8) \times u$ units of work, one could send one puzzle of 10 bits and one puzzle of 8 bits to the client instead of sending either a single 10-bit puzzle or a single 11-bit puzzle. The use of multiple sub-puzzles requires an understanding or how it impacts the puzzle granularity across the range of difficulties it covers. Unlike time-lock puzzles, which provide uniform granularity across puzzle difficulty, multiple hash-based puzzles provide finer granularity at lower ranges of work with gaps steadily increasing as the puzzle difficulty does. In order to maintain fine-grained control across heavier workloads and with faster client CPU speeds, the number of sub-puzzles given to a client must slowly increase. While dialing in the granularity is important, hash-based puzzles also have a problem in that their solution time can vary considerably based on how lucky the client is in its search. A search could terminate after the first try or after the $2^n$ try. When applied over a significant number of puzzles (as would be the case for network puzzles), the average difficulty will converge to the desired level.

While multiple sub-puzzles can improve puzzle granularity, it does so via a linear increase in generation time and cost. Because of this, one embodiment of this invention uses another mechanism for delivering fine-grained puzzles in which a single n-bit puzzle is given to the client along with a randomly calculated range of values that the answer falls within. To adjust the difficulty of the puzzle, the range or search space is increased or decreased. In addition this ability to vary the range also provides a method for manipulating network puzzle difficulties dynamically, although each device in the network may need to pass a puzzle back to the client.

The present invention provides a method for increasing puzzle difficulty without attaching a new puzzle by dynamically increasing the calculated range of values passed back. Hint-based hash reversal puzzles are fine-grained puzzles in which a single hash-reversal puzzle is given to the client along with a hint that gives the client an idea of where the answer lies. The hint is a single value that is near the answer. To adjust the difficulty of the puzzle, the accuracy of the hint is increased or decreased. For example, suppose a randomly generated number x is used as the input to the hash h(x). To generate a puzzle with O(D) difficulty, the issuer passes the client the hash and a hint, x−u(0,2D) is a randomly chosen number uniformly distributed between 0 and 2d. The client then starts at the hint and searches the range linearly for the answer.

To illustrate how the range may be varied, suppose a randomly generated secret x is used as input to the hash. To generate a puzzle with O(D) difficulty, the issuer passes the client (h(x), x−u(0,2D)) where h(x) is the value of the hash to match, u(0,2D) is a randomly chosen number uniformly distributed between 0 and 2D, x−u(O,2D) is the beginning of the search range the client needs to search from. The client must search from the point given to find the x whose hash matches the value of h(x). As before, the amount of time actually taken by the client to find x can vary based on luck. This variation in the range also provides a method for manipulating network puzzle difficulties dynamically. The present invention increases puzzle difficulty without attaching a new puzzle by dynamically increasing the calculated range of values passed back.

"Unit work" describes the basic operation the client must repeatedly perform to solve the puzzle and the average amount of time the operation requires on implemented system. "Range" describes the breadth of difficulties supported by the puzzle based on the size (in bits) of the secret. The "mean and maximum granularity" describes the average spacing between adjacent puzzle difficulties and the largest spacing between any two adjacent puzzle difficulties. "Exact" describes whether or not the load given to the client is exactly predictable or probabilistic. "Parallel computation" describes whether or not the client can distribute the computation to other machines in order to solve the puzzle more quickly.

Figure 4:
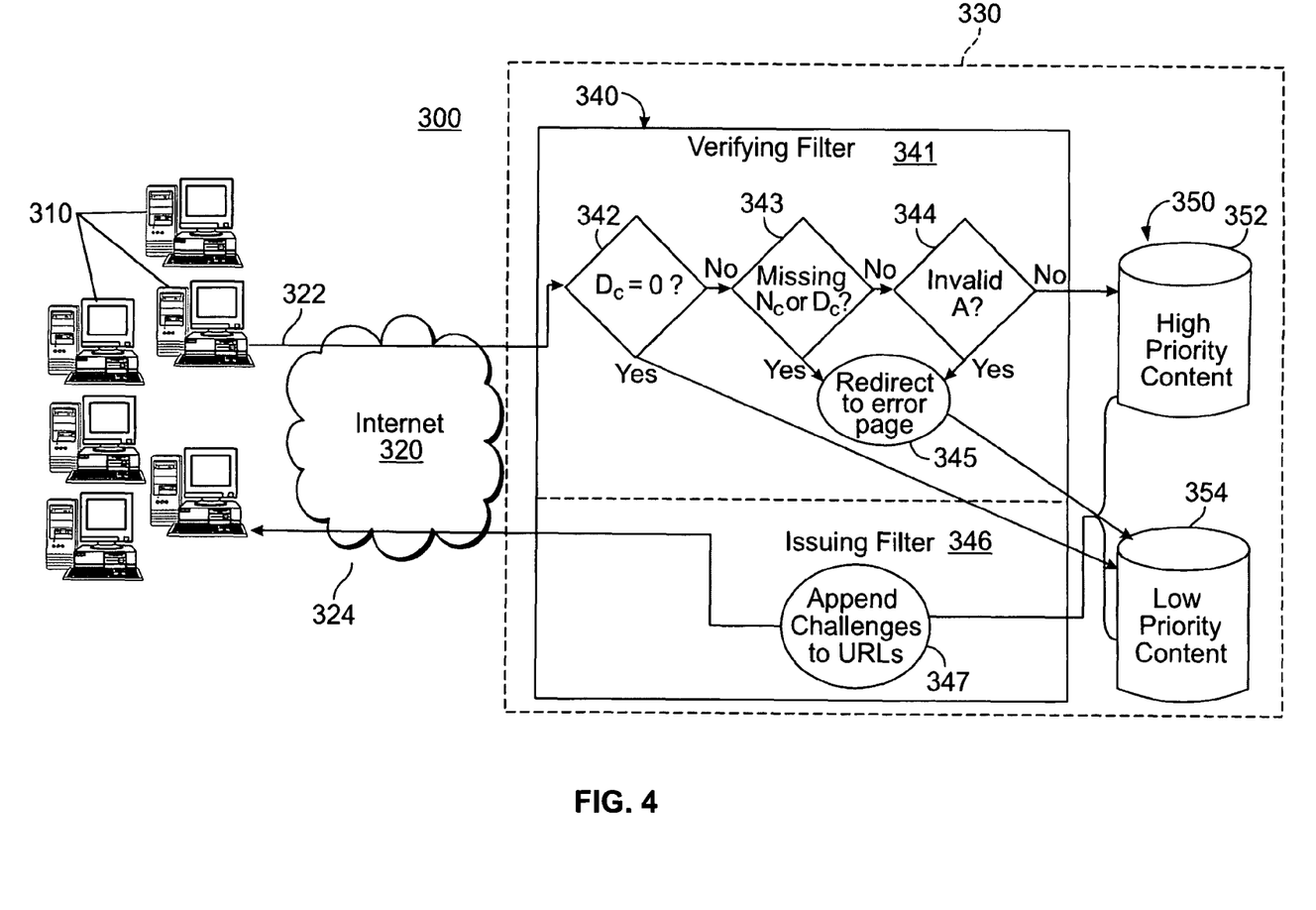
FIG. 4 is an alternate embodiment of a network puzzle defense system of the puzzle protocol framework at the application layer according to the present invention.

FIG. 4 is an alternate embodiment of a network puzzle defense system of the puzzle protocol framework at the application layer according to the present invention. As shown in FIG. 4, clients 310 access content 350 (e.g. web content) such as a service on a remote server 330 by way of a network 320 (e.g. the Internet). Typically, the content 350 is protected by a proof-of-work challenge 340 for security purposes. The proof-of-work challenge 340 protects content 350 transparently and efficiently by prioritizing client 310 access to the content 350.

The client 310 sends a first request, shown by 322, to the server 330 to access content 350 such as a server resource. In this embodiment, the server 330 can be an Apache server that provides a rich interface for writing challenges that range from those that control how a client 310 accesses a server 330, e.g., mod_rewrite, to those that dynamically generate content 350, such as mod_include.

The request 322 is received by the server 330 whereupon the current and historical load of the client 310 is determined by evaluating the loads to a threshold value. A proof-of-work challenge 340 includes the threshold value and may be, for example, a hash function.

While this system 300 could use any of several different types of proof-of-work challenges, in one embodiment the present invention, uses the compact Targeted Hash-Reversal function of the form:

$$H(N_c\|D_c\|A) \equiv 0 \bmod D_c$$

where H is a pre-image resistant hash function with output uniformly-distributed, NC is a client-specific nonce generated by the web server 330, DC is the client-specific difficulty set by the web server 330, and A is the solution that a JavaScript solver of the client 310 must find. Since both NC and DC are fixed by the web server 330 and H is pre-image resistant, this proof-of-work challenge requires the solver to try various values for A until the equation is satisfied. This is expected to take DC tries on average because the output is uniformly-distributed.

The proof-of-work challenge 340 has an issuing filter 346 that embeds proof-of-work challenges 340 in outbound responses 350 and a verifying filter 341 that prioritizes inbound requests 322 based on having a valid challenge with a correct answer.

To prioritize requests 322, the server 330 is configured with content 350 of two virtual hosts 352, 354. The default low-priority virtual host 354 does not support persistent HTTP connections, and tears down any connection after servicing a single request 322. Only a limited number of low priority clients 310 are handled concurrently; all additional low-priority clients 310 are rejected, for example, with error code "503: Service Temporarily Unavailable".

A request 322 demonstrating a correct answer to a valid challenge is redirected to the high-priority virtual host 352, which supports more concurrent clients 310 and does not tear down connections. However, once a high-priority client 310 sends an invalid request 322, the connection is redirected back to the low-priority virtual host 354 to be terminated.

The proof-of-work challenge 340 includes variables specific to the client 310, which are difficulty DC and nonce NC. To establish DC, the proof-of-work challenge 340 uses a counting Bloom filter to track the load imposed by individual clients 310. The counting Bloom filter is an efficient data structure that offers a tradeoff between size and the probability of incorrectly assigning a high difficulty to a client 310. It has no false negatives, for example, a client 310 known to be malicious will never be issued a trivial proof-of-work challenge 340, and the probability of a false positive can be driven arbitrarily low with additional memory. Given that the Bloom filter uses k different hash functions to index into an array of n counters, the probability of misclassifying a single client 310 from an estimated population of m clients is approximately $$\left(1 - e^{-\frac{km}{n}}\right)^k.$$

Using a value of k that minimizes that equation, the error is approximated by $0.6185^{n/m}$. Thus to achieve a misclassification rate of less than 0.1% of 20,000 clients, the Bloom filter requires 288,000 counters or a total of 1.2 MB when using 32-bit counters. The Bloom filter is updated in every 10 seconds so that the difficulty is held constant long enough to give clients 310 a chance to respond but short enough so that the difficulty can respond to sudden changes in load. When the structure is updated, each counter c is updated according to the following logic:

$$c_{t+1} = \begin{cases} c_t + requests_t - decay & requests_t \le decay \\ c_t + 1.01^{requests_t - decay} & otherwise \end{cases}$$

which states that the difficulty decays linearly from one time window to the next unless the requests 322 in the last time period t are greater than the rate of decay, in which case those extra requests count exponentially towards increasing the difficulty.

The client-specific nonce NC is created in a secure manner by encrypting the client's identity IPc and the unmodified URL using a secret key Ks held by the server 330:

$$N_c = E_{K_s}(IP_c \| URL)$$

binding the nonce NC and entire proof-of-work challenge 340, to the client 310 and specific content for a fixed window of time. When the server key changes, the existing client nonces effectively expire, meaning that solutions cannot be reused indefinitely. The unpredictable secret key prevents offline solving attacks. The server 330 can update the key independently from the Bloom filter, as frequently as needed to keep client 310 solutions fresh, however it is contemplated that the server 330 can update the key and Bloom filter simultaneously.

The server 330 includes the proof-of-work challenge 340 that further includes a verifying filter 341 and an issuing filter 346. The issuing filter 346 scans and parses HTML documents as they are served. It adds proof-of-work challenges 340 to all tags containing URLs, as well as the instructions necessary for the browser of a client 310 to solve the challenge 340.

The issuing filter 346 includes the solution instructions for proof-of-work challenges 340 through the addition of a link to a JavaScript file at the head of the document so that it is retrieved first (unless already cached) and the script may work as the remaining tags are incorporated into the in-memory Document Object Model ("DOM") of the client 310. This tag does not have a proof-of-work challenge 340 because the client 310 needs this resource before solving any proof-of-work challenge 340.

The issuing filter 346 incorporates proof-of-work challenges 340 into tags by adding the variables $N_C$ and $D_C$ as tag attributes. More specifically, the proof-of-work challenge 340 is embedded within a URL found in any HTML. Depending on the loads of the client 310, a proof-of-work challenge 340 is created that is proportional to the historical load the client 310 has placed upon the server 330 as well as the current load on the server 330.

The server 330 transmits the proof-of-work challenge 340 to the client 310 utilizing a network layer over the Internet 320. To avoid accidentally triggering HTML escape sequences, the values are transmitted in hexadecimal. It is important to observe that $N_C$ differs between tags because it is calculated from the original unmodified URL of each tag. The filter also appends a default difficulty of "$D_C = 0$" to the actual URL so that a client 310 without JavaScript enabled can follow the link while at the same time indicating to the server 330 that the proof-of-work challenge 340 cannot be solved. Before sending the content 350, shown by 324, the issuing filter 346 updates the Bloom filter to count the request for that client 310.

The verifying filter 341 parses requests 322 to extract any appended proof-of-work variables. If the request 322 contains the variables $N_C$ and $D_C$ they are checked to be current and correct before the proof-of-work challenge 340 does any computationally expensive operations such as hashing. If $N_C$ and $D_C$ are valid at 343, the verifier then proceeds to check that A—the solution that a JavaScript solver of the client 310 must find—is valid at 344. Thus, the request 322 is accepted and the content 350 is sent to the client 310.

There are three primary reasons why the request 322 might be rejected by the verifying filter 341: the URL has no proof-of-work attached, the parameters are not current, or the solution is not valid. The first two failures may have occurred for a variety of legitimate reasons and are not necessarily indicative of a malicious client.

If the request 322 contains no PoW parameters, then the client 310 may have been linked to this resource from an external server (not shown in FIG. 4) that has not yet adopted the system 300 and hence did not assign a proof-of-work challenge. It is also possible that the website was arrived at by manually entering the URL into the address bar.

Upon receiving a request, the server 330 verifies that the URL contains a valid challenge and correct solution before servicing it. If either the challenge is stale or the solution is incorrect, the system 300 denies the request and returns an error page containing a link to the resource and a new challenge.

For example, if the request 322 contains PoW parameters, however they are invalid, the client 310 may have been directed to this site from an external server that appended its own values for $N_C$ and $D_C$. Alternatively, the user may have taken enough time reading the last webpage that the server 330 updated the key $K_S$ invalidating the client nonce $N_C$. Once a request 322 is denied, the filter returns an error page 345 to the client 310. The error page 345 contains some error text and a single link to the requested content. After it has been processed by the issuing filter 346, the error page 345 has a proof-of-work challenge 340 embedded into it. The key feature is highlighted and the error page 345 includes an OnLoad (.) script that immediately solves the proof-of-work challenge 340 and redirects the browser to use the proper URL. The web browser history of the client 310 omits the error page, so a user can move through their browsing history without ever seeing this page.

A notable exception is for clients 310 that do not have JavaScript enabled. Recall that the issuing filter embeds "$D_C = 0$" into all URLs within HTML tags. If a client's browser does not have JavaScript enabled, it will not solve the proof-of-work challenge and instead use the URL verbatim. When the verifying filter 341 observes such a URL with the variable $D_C$ set to zero, shown by 342, it will conclude that the client cannot solve the proof-of-work challenge 342 and accept the request on the low-priority virtual host 354.

The fundamental script is the Solve(.) script which is used to solve individual proof-of-work challenges that the browser encounters. The script takes a tag as input and extracts the attributes $N_C$ and $D_C$. Provided it can find those attributes, it systematically hashes them with various values for A until the Targeted Hash-Reversal function is satisfied. The script removes existing proof-of-work variables embedded in the URL (specifically the "$D_C$=0") and then appends the variables $N_C$, $D_C$ and A to the URL, shown at 347. The URL is then updated in the in-memory DOM for use when the browser needs to fetch that resource.

The other script of note runs as soon as the script file is read and hooks the event triggered when tag elements are added to the DOM. As content tags (such as <IMG>) are added to the DOM, it calls the Solve(.) script so that the URL in the tags reflect valid work. As hyperlink tags (<A>) are added, they have their ONCLICK attribute modified to call the Solve(.) script, so proof-of-work challenges for hyperlinks are only solved once the user chooses to follow the link.

Figure 5:
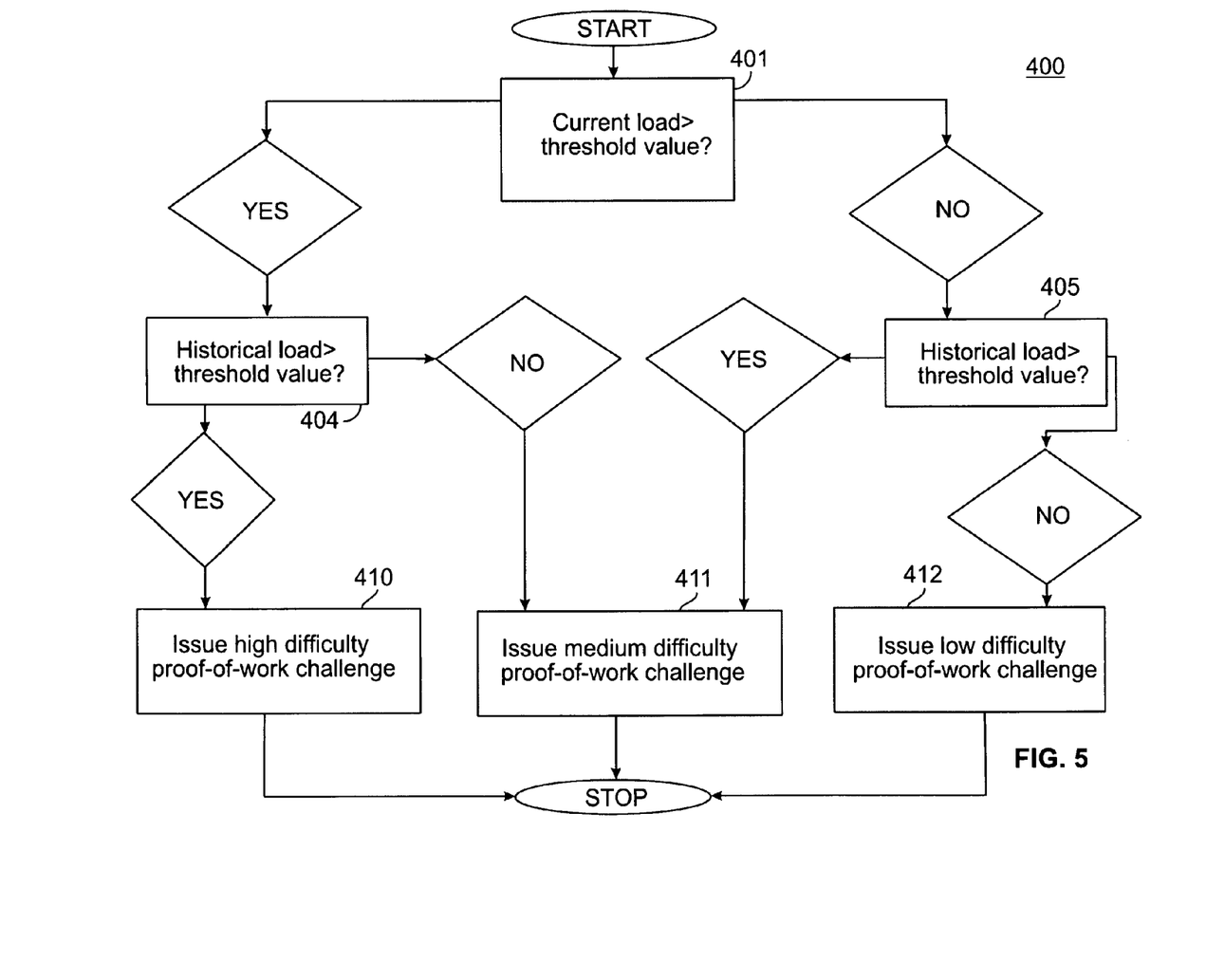
FIG. 5 is a flow chart of a network puzzle defense system of the puzzle protocol framework at the application layer that prioritizes client requests according to the present invention.

FIG. 5 is a flow chart of a network puzzle defense system of the puzzle protocol framework at the application layer that prioritizes client requests according to the present invention. The proof-of-work challenge issued is proportional to the maliciousness of the client. The maliciousness of the client is determined by the current load and historical load on the server. As shown in FIG. 5, the load the client places on the server during a request is determined. At step 401, if the current load is greater than a pre-determined threshold value, then the historical load the client has placed on the server is determined. The threshold value may be, for example, a hash function including a client-specific nonce generated by the web server and a client-specific difficulty level set by the web server as described in reference to FIG. 4.

If the historical load is also greater than a pre-determined threshold value at step 404, then the server issues a high difficulty proof-of-work challenge at step 410. If the historical load is not greater than a pre-determined threshold value at step 404, then the server issues a medium difficulty proof-of-work challenge at step 411. If, at step 401, the current load is not greater than a pre-determined threshold value, the historical load the client has placed on the server is determined. If the historical load is greater than a pre-determined threshold value at step 405, then the server issues a medium difficulty proof-of-work challenge at step 411. If the historical load is not greater than a pre-determined threshold value at step 405, then the server issues a low difficulty proof-of-work challenge at step 412. Therefore, the client puzzle has a difficulty level tailored to the client.

Thus, while a multitude of embodiments have been variously described herein, those of skill in this art will-recognize that different embodiments show different potential features/designs which can be used in the other embodiments. Even more variations, applications and modifications will still fall within the spirit and scope of the invention, all as intended to come within the ambit and reach of the following claims.

What is claimed is:

1. A method of prioritizing a service request in a network system, comprising:
    sending a first request from the client to the server to access a server resource;
    creating by the server a proof-of-work challenge, wherein the server issues the proof-of-work challenge at an arbitrary location in the network system, the arbitrary location including the server, an end host, a firewall, and a router;
    embedding the proof-of-work challenge within a uniform resource locator at an application layer in the network system, the proof-of-work challenge including an instruction to obtain a solution using Hyper-Text Markup Language to reference a scripting language file;
    transmitting the embedded proof-of-work challenge from the arbitrary location to the client;
    solving by the client the proof-of-work challenge to obtain a solution to the proof-of-work challenge;
    forwarding a second request from the client to the server, wherein the second request includes the proof-of-work challenge and the solution;
    establishing by the server a solution value based on the accuracy of the proof-of-work challenge and the solution;
    comparing the solution value to a threshold value;
    assigning a priority value to the second request based on said comparing step; and
    processing by the server the second request.

2. A method of prioritizing a service request in a network system at the application layer according to claim 1 wherein said processing step further comprises the step of allowing the request to proceed.

3. A method of prioritizing a service request in a network system at the application layer according to claim 1 wherein said processing step further comprises the step of denying the request.

4. A method of prioritizing a service request in a network system at the application layer according to claim 1 wherein said forwarding step further comprises the step of utilizing a network layer of the network system.

5. A method of prioritizing a service request in a network system at the application layer according to claim 1 wherein said forwarding step further comprises the step of accepting by the server the second request from the client.

6. A method of prioritizing a service request in a network system at the application layer according to claim 1 wherein said transmitting step further comprises the step of utilizing a network layer of the network system.

7. A method of prioritizing a service request in a network system at the application layer according to claim 1 wherein said sending step further comprises the step of receiving by the server the first request from the client.

8. A method of prioritizing a service request in a network system at the application layer according to claim 1 wherein said supplying step further comprises the step of embedding the instruction within the uniform resource locator.

9. A method of prioritizing a service request in a network system at the application layer according to claim 1 wherein said supplying step further comprises the step of aborting the connection between the client and the server.

10. A method of prioritizing a service request in a network system at the application layer according to claim 1 wherein said solving step further comprises the step of using the scripting language file.

11. A method of prioritizing a service request in a network system at the application layer according to claim 10 wherein the scripting language file is a JavaScript file.

12. A method of prioritizing a service request in a network system at the application layer according to claim 1 wherein said creating step further comprises the step of determining the current load and the historical load of the client.

13. A method of prioritizing a service request in a network system at the application layer according to claim 12 wherein said determining step further comprises the step of evaluating the current load and the historical load of the client to a threshold value.

* * * * *